United States Patent [19]

Bensussen et al.

[11] Patent Number: 4,638,692
[45] Date of Patent: Jan. 27, 1987

[54] WIRE STRIPPER WITH DOUBLE WEDGE SPRING LOADED GRIPPER

[75] Inventors: Isaac M. Bensussen; Hans Tittel, both of Seattle, Wash.

[73] Assignee: The Boeing Company, Seattle, Wash.

[21] Appl. No.: 769,958

[22] Filed: Aug. 26, 1985

[51] Int. Cl.⁴ ............................................. H02G 1/12
[52] U.S. Cl. .................................. 81/9.41; 403/369; 279/28
[58] Field of Search ............... 81/9.4, 9.41, 9.42, 81/9.51; 403/369, 374, 105; 279/28, 57, 65; 339/254 R, 268 S, 248 S

[56] References Cited

U.S. PATENT DOCUMENTS

| | | | |
|---|---|---|---|
| 1,081,427 | 12/1913 | Brummett et al. | 279/28 |
| 1,854,782 | 4/1932 | Cook | 403/369 |
| 2,054,529 | 9/1936 | Wiggins | 81/9.51 |
| 2,210,058 | 8/1940 | Blackburn | 339/268 S |
| 2,571,078 | 10/1951 | Vollmer | 140/1 |
| 2,657,933 | 11/1953 | Stuebner | 279/28 |
| 2,724,985 | 11/1955 | Chamberlin | 81/9.5 |
| 3,089,367 | 5/1963 | Schluter | 81/9.5 |
| 3,154,980 | 11/1964 | Hayden et al. | 81/9.51 |
| 3,176,550 | 4/1965 | Marcotte | 81/9.51 |
| 3,222,957 | 12/1965 | Kramer et al. | 81/9.51 |
| 3,461,719 | 8/1969 | Welhoelter | 279/28 |
| 3,530,746 | 9/1970 | Gudmestad | 81/9.51 |
| 3,563,117 | 2/1971 | Bolssens | 81/9.5 |
| 3,727,492 | 4/1973 | Zanni | 81/9.5 A |
| 3,765,277 | 10/1973 | Sorensen | 81/9.5 A |
| 3,852,850 | 12/1974 | Filhaber | 403/369 |
| 3,880,022 | 4/1975 | Miller | 81/9.5 R |
| 4,072,069 | 2/1978 | Bieganski | 81/9.5 A |
| 4,329,891 | 5/1982 | Bieganski | 81/9.5 A |

FOREIGN PATENT DOCUMENTS 2834904 3/1979 Fed. Rep. of Germany .

Primary Examiner—Roscoe V. Parker
Attorney, Agent, or Firm—Joan H. Pauly

[57] ABSTRACT

A wire gripper (48) includes a housing (50,52,56) that defines a chamber (62) which has sidewalls (64) that taper in an axial direction. Jaws (66) are closely and slidably received into chamber (62). Axial spring (74) biases jaws (66) axially outwardly relative to chamber (62). Radial springs (78) bias jaws (66) toward sidewalls (64). A double-acting cylinder (94) moves housing (50,52,56) axially outwardly to tighten jaws (66) around a wire (200), and axially inwardly to move jaws (66) against jaw stop (88) to open jaws (66). Preferably, axial movement of wire (200) pulls pivoting blades (6,8) closed. Gripper (48) may be modified to cut or punch wire (200) rather than grip it.

31 Claims, 20 Drawing Figures

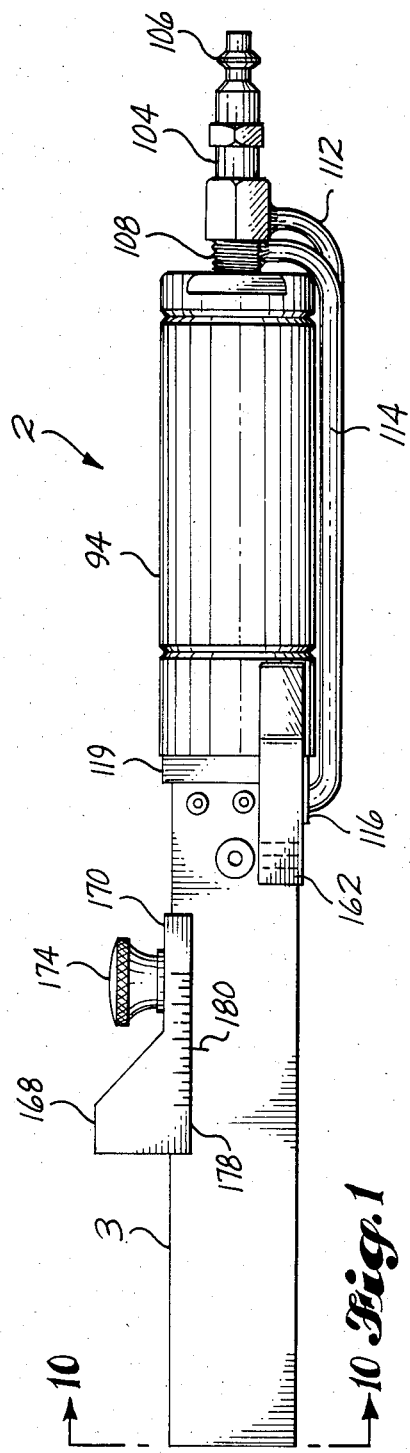
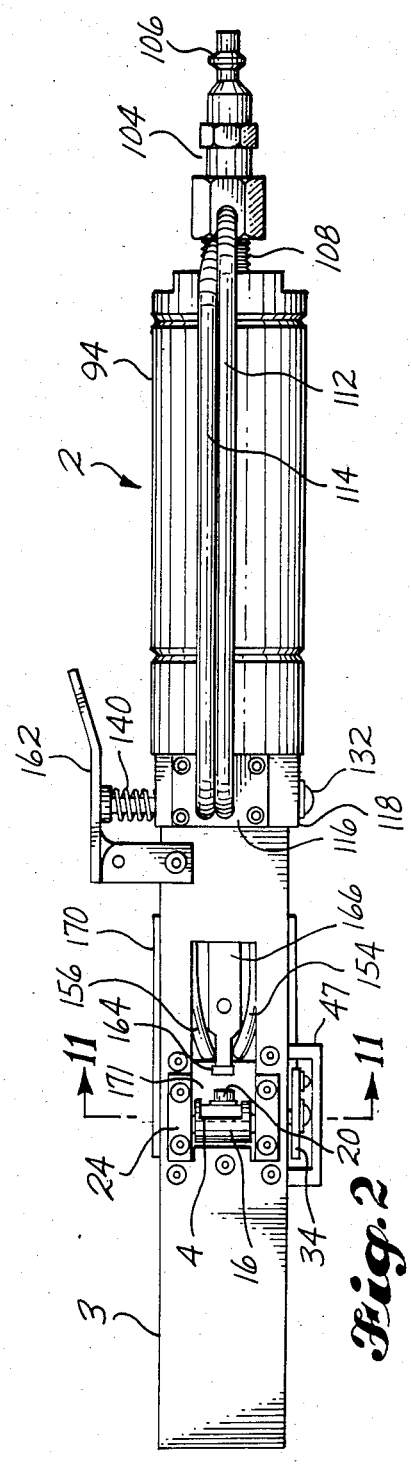

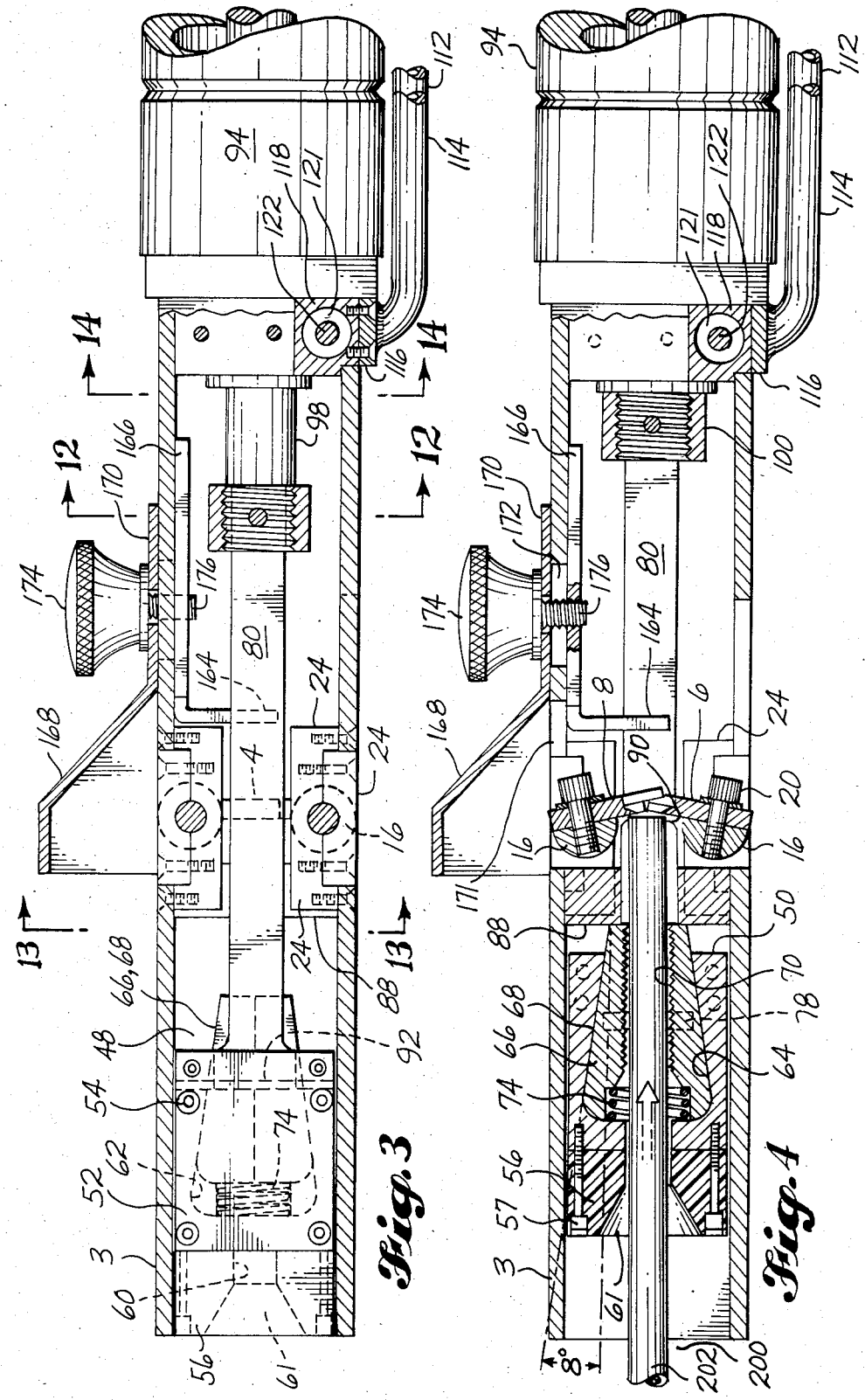

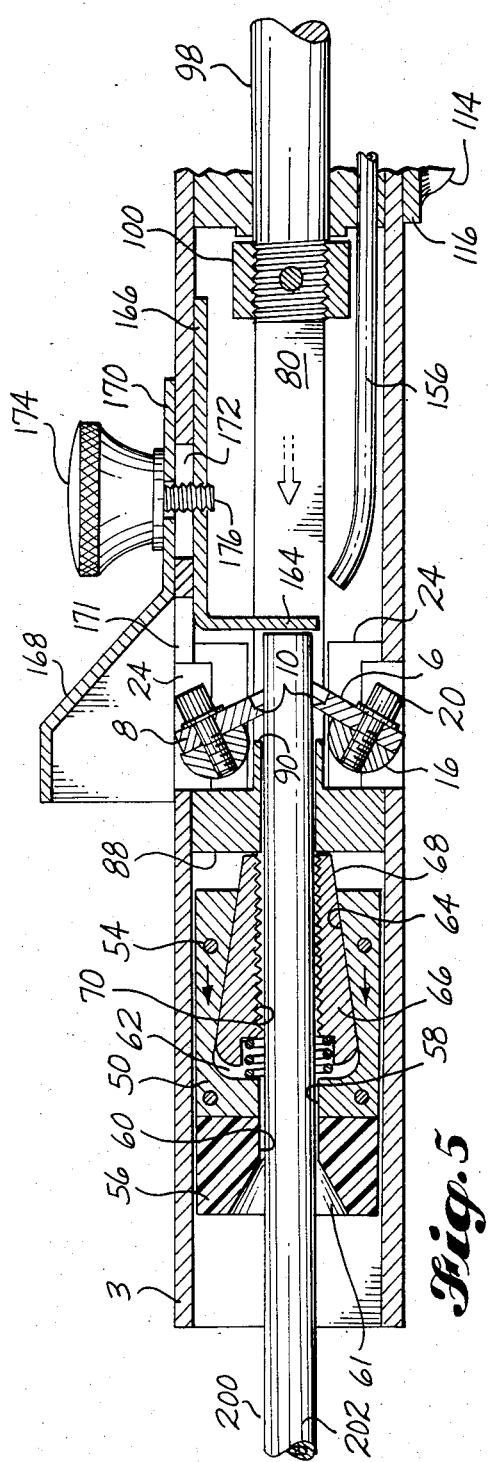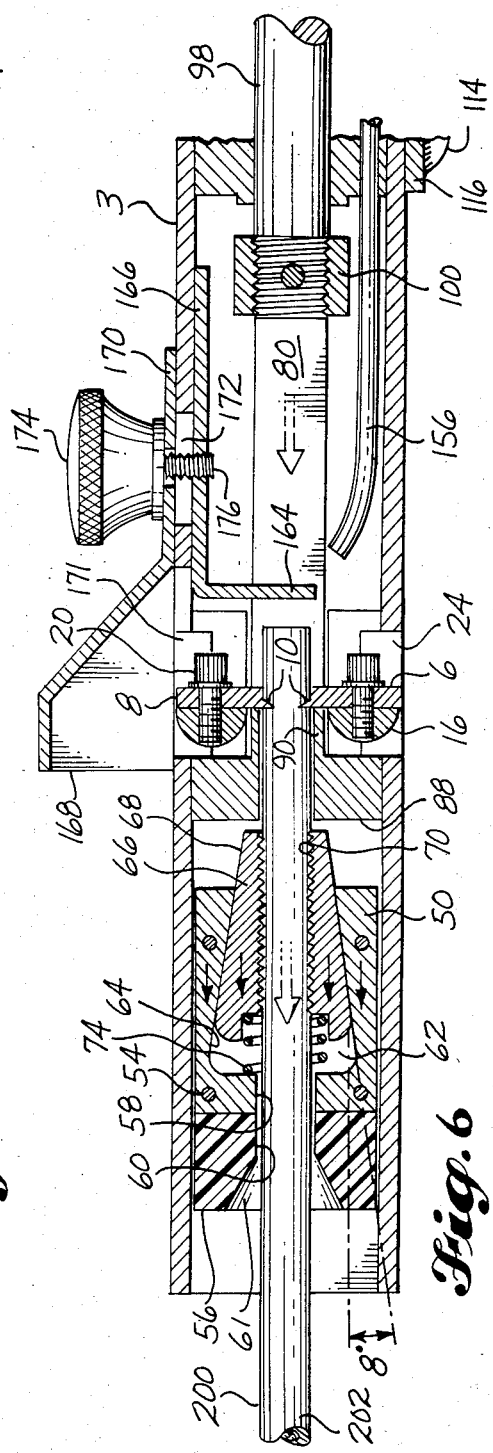

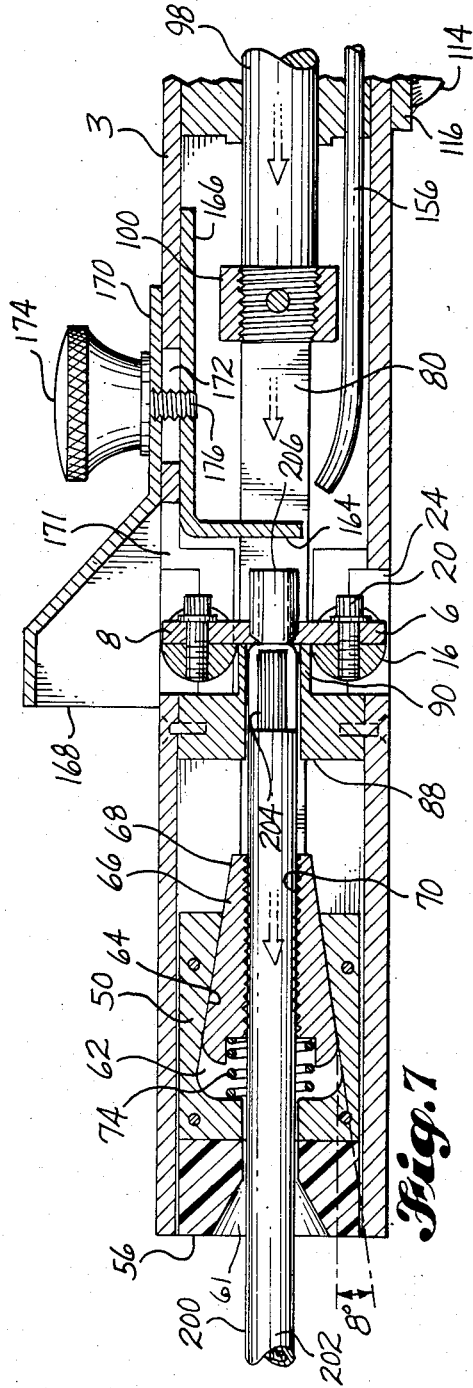
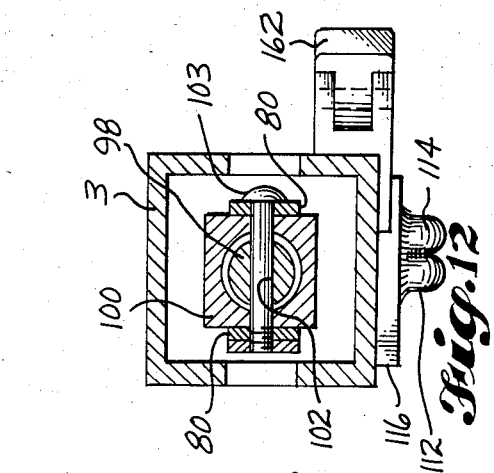
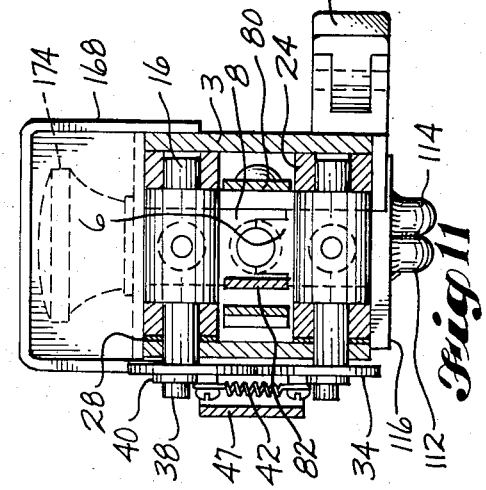
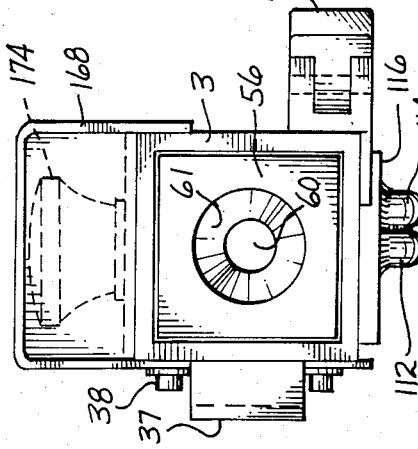

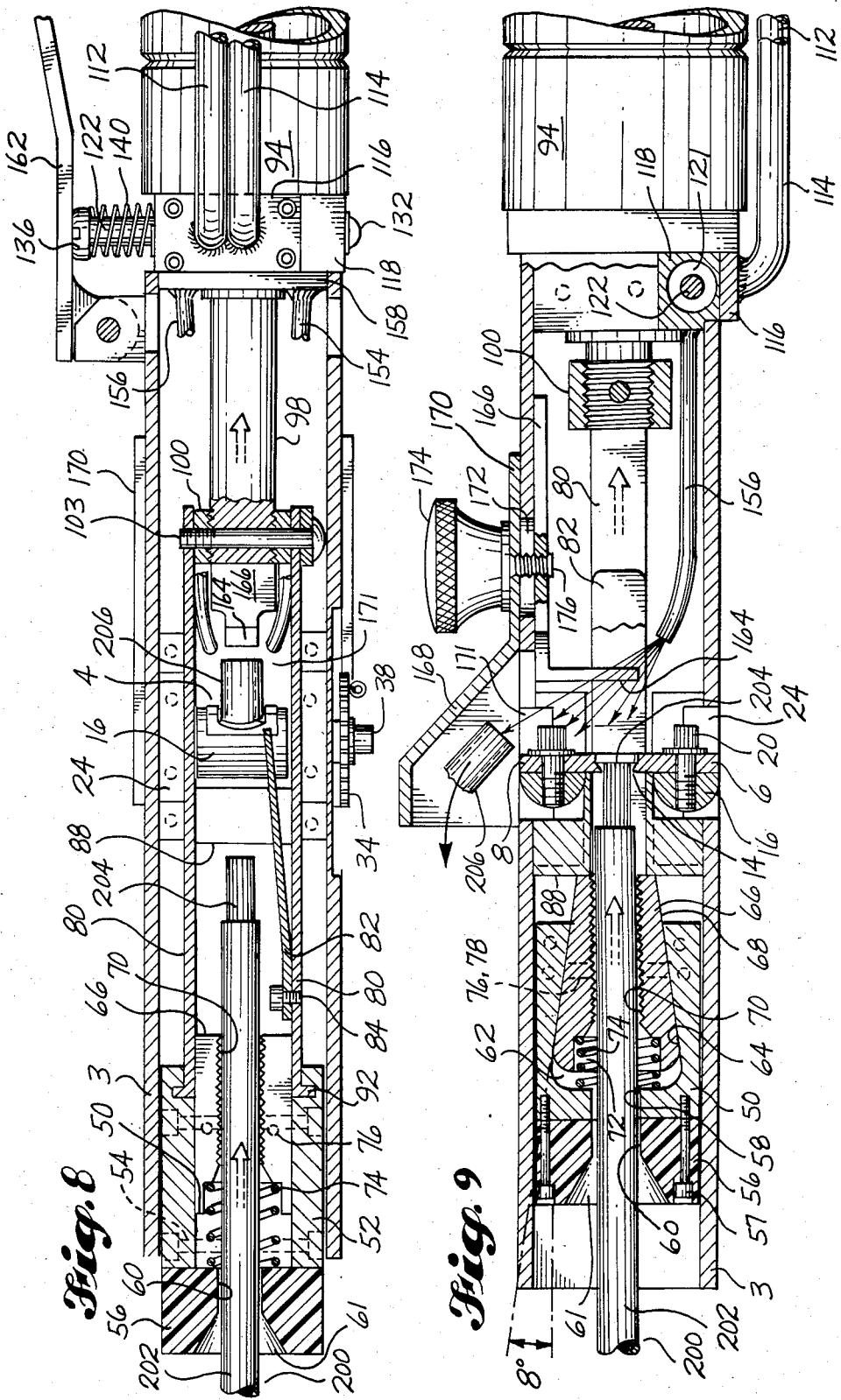

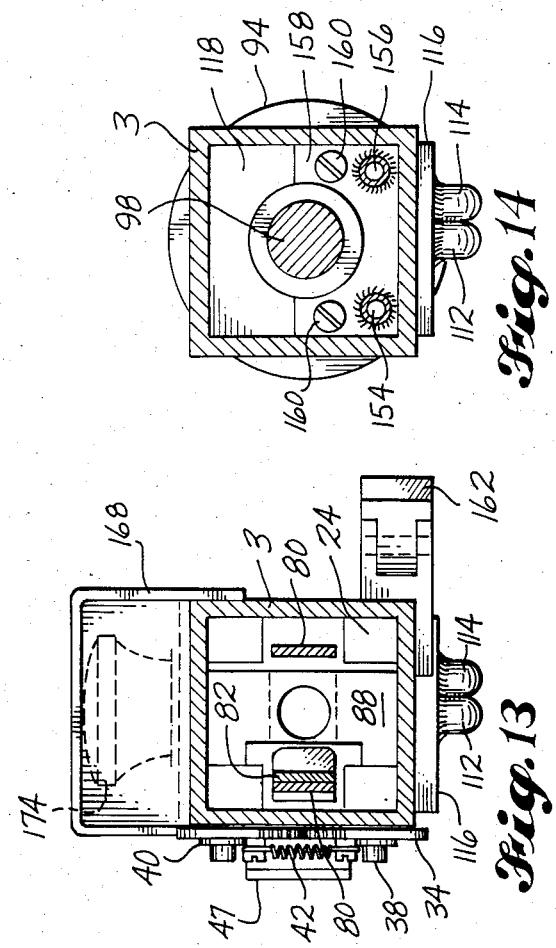

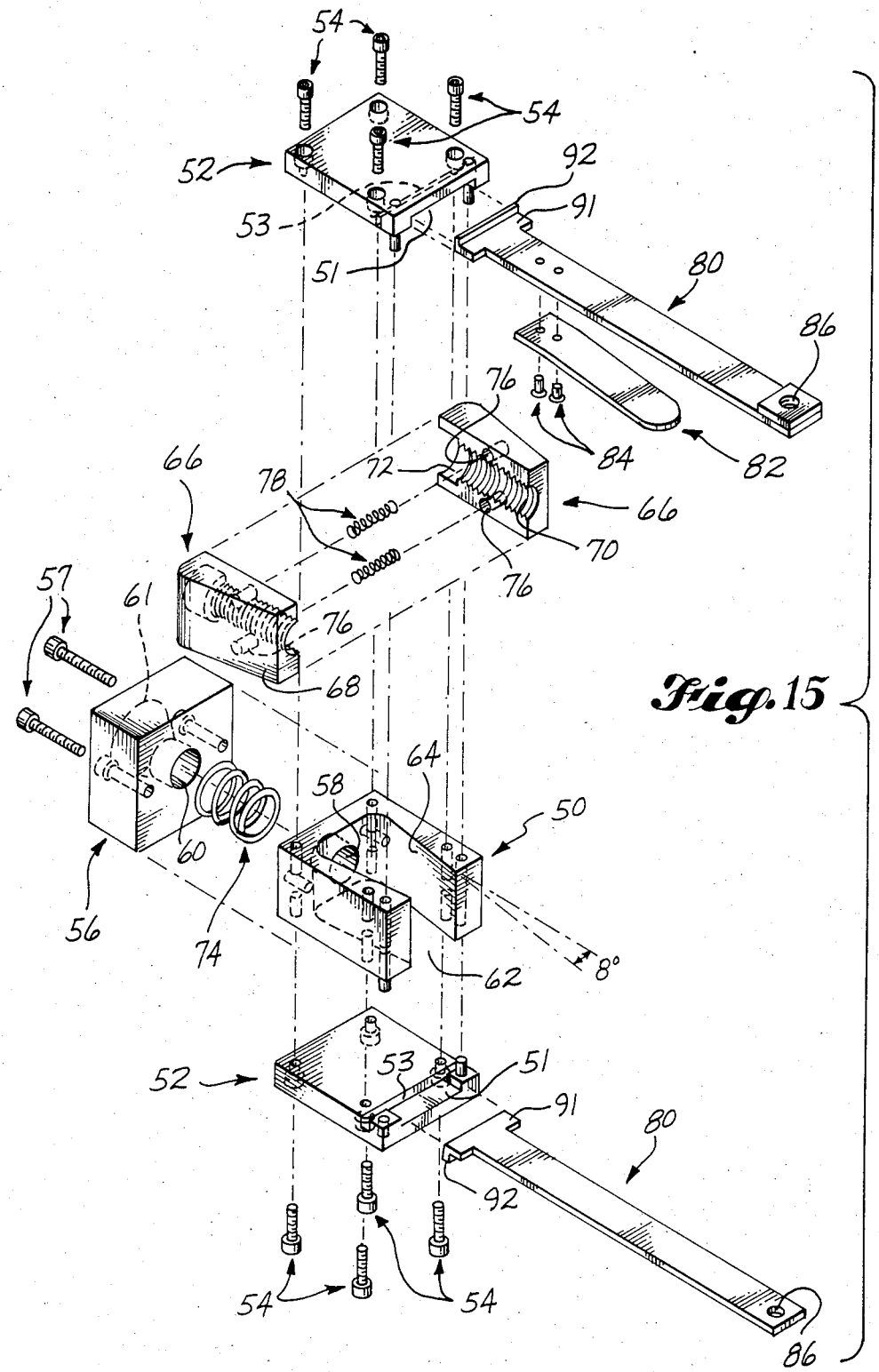

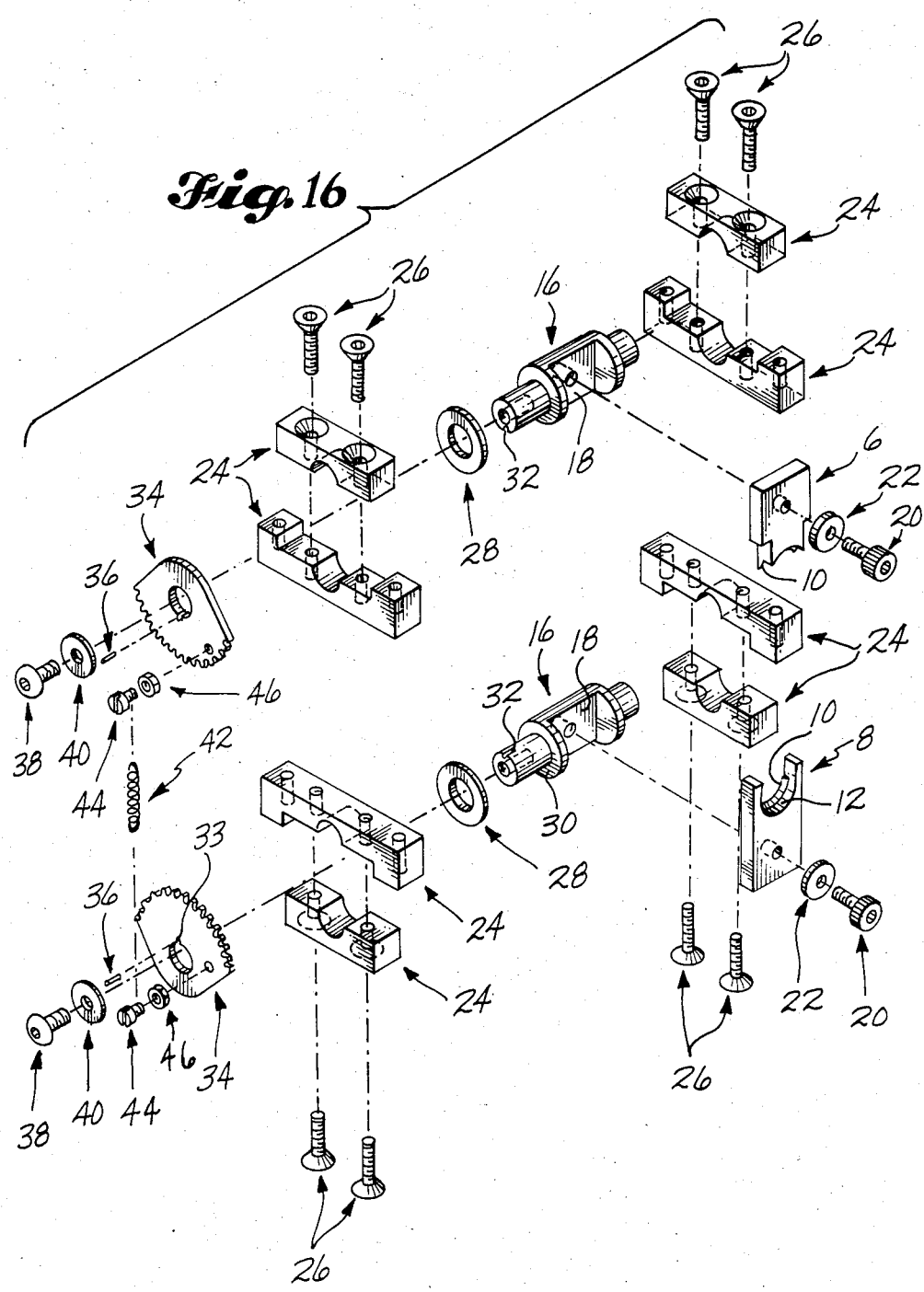

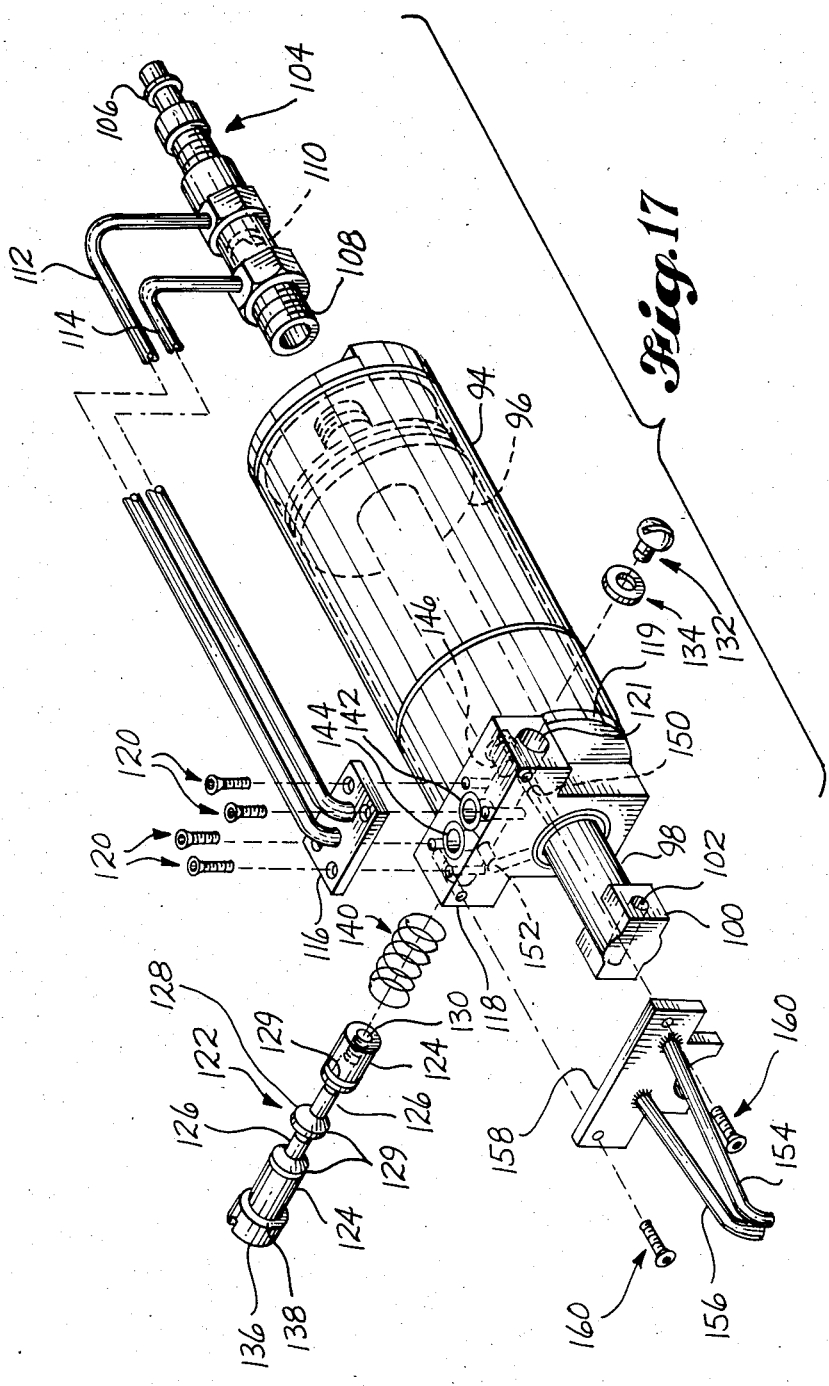

WIRE STRIPPER WITH DOUBLE WEDGE SPRING LOADED GRIPPER

TECHNICAL FIELD

This invention relates to wire strippers and, more particularly, to a portable stripper having pivotable blade means and gripping means which includes wedge shaped jaws that are slidably positioned within a housing and are tightened around a wire by axial movement of the housing.

BACKGROUND ART

There are many situations in which there is a need to strip the outer insulating cover off an end portion of a wire. Such stripping may be accomplished by hand using a knife, but hand stripping has several serious drawbacks. Hand stripping can be hazardous to the worker doing the stripping and is also very time-consuming. In addition, manual stripping tends to result in nicking and scarring of the wire core. In some environments, such as sophisticated aircraft environments, even slight nicking or scarring of the wire core is unacceptable. Power strippers that speed up the stripping process and reduce the hazards to the worker and the tendency to scar the wire are commercially available. However, such power strippers are generally not portable and are limited to stripping wire smaller than AWG No. 10. Thus, a need exists for a hand held portable power stripper that can handle large gauge wire and that can be used in a variety of environments, including shops, airfields, and areas on board aircraft.

Tools for stripping wires are disclosed in the following U.S. Pats. Nos. 2,054,529, granted Sept. 15, 1936, to E. J. Wiggins; 2,571,078, granted Oct. 9, 1951, to J. Vollmer; 2,724,985, granted Nov. 29, 1955, to R. R. Chamberlin; 3,089,367, granted May 14, 1963, to H. P. Schluter; 3,154,980, granted Nov. 3, 1964, to R. L. Hayden, et al; 3,176,550, granted Apr. 6, 1965, to R. A. Marcotte; 3,222,957, granted Dec. 14, 1965, to L. Kramer, et al; 3,530,746, granted Sept. 29, 1970, to R. Gudmestad; 3,563,117, granted Feb. 16, 1971, to F. P. J. Bolssens; 3,727,492, granted Apr. 17, 1973, to Vincenzo Zanni; 3,765,277, granted Oct. 16, 1973, to William W. Sorensen; 3,880,022, granted Apr. 29, 1975, to Harry E. Miller; 4,072,069, granted Feb. 7, 1978, to Zdzislaw Bieganski; and 4,329,891, granted May 18, 1982, to Zdzislaw Bieganski. West German Pat. No. 2,834,904, granted Mar. 8, 1979, to Hitachi, Ltd., Tokyo, discloses a tool for wrapping wire around studs which apparently includes a wire stripping mechanism.

The Wiggins patent discloses a wire stripper which has pivotably mounted knives and no separate gripper and in which pulling the wire causes the knives to pivot into a closed position to cut and strip the insulation. Marcotte discloses a stripper having pivotably mounted knives that are closed by a piston and toggle link arrangement, and gripping jaws similarly mounted and operated that pull the end of the insulation off the wire and let it drop out of the stripper. Kramer et al. disclose cutters that are pivotably mounted on a slide and are closed by contact with a stop, and pivotably mounted clamping jaws that are activated by a spring loaded toggle mechanism. Bolssens discloses a portable stripper in which a cam on a piston rod allows springs to move one gripping jaw and one cutting jaw laterally to engage the wire and in which the pairs of jaws are moved apart to strip the wire. The portable stripper disclosed in the Zanni patent includes two pairs of jaws, one for clamping and one for cutting, each of which has two jaws that are pivotably connected, biased apart by a spring, and closed by contact with an inclined plane cam surface on a longitudinally movable slide. Sorensen discloses a portable stripper in which cutter jaws and gripper jaws are pivotably mounted and closed by toggle links and in which the cutter jaws are mounted on a slide and moved axially to strip the wire. Miller discloses a portable stripper which has two rigid V-shaped cutting blades, in which wire is cut by being inserted into the V's formed by the blades, and in which the wire is stripped by moving one blade with respect to the other. The first Bieganski patent discloses a portable stripper having pivotably mounted clamping jaws that are closed by a cam surface on a sliding rod that separates a pair of rollers that are pivotably connected to the jaws, and cutting jaws that are pivotably connected to the rod, are pressed together by the pivoting of the clamping jaws, and move longitudinally to strip the wire. The second Bieganski patent discloses a stripper that resembles a pair of pliers and has pivotably mounted gripping jaws which are closed by toggle links and pivotably mounted cutting jaws which are closed by the gripping jaws.

The Vollmer patent discloses apparatus for processing wire that includes a stripping mechanism. The stripping mechanism has clamping fingers for gripping the wire, which fingers are pivotably mounted on gears so that they "will work together". The jaws are moved longitudinally to strip the wire. The knives that cut the insulation are mounted on opposing slides and are moved laterally into contact with the insulation by a rack and pinion mechanism.

Chamberlin discloses a portable wire stripper in which a thumb button is pressed to grip the wire and then a trigger is pulled to engage the knives. The gripping jaws are mechanically linked to the thumb button and move longitudinally when the thumb button is pressed. As the jaws move longitudinally, they are urged together by contact with a tapered inner surface of the housing. The knives are operated by the trigger in a similar manner, being first cammed inwardly to cut the insulation and then pulled longitudinally to strip the wire. The stripper has an adjustable stop for adjusting the amount of insulation stripped. Chamberlin states that the piece of stripped insulation falls out of or "may be discharged from" holes in the stripper.

Schluter discloses a portable device in which insulation is stripped from a wire by "well-known means" and then a metal braid covering is stripped. The mechanism for cutting and stripping the metal braid includes a main cylinder and a piston which reciprocates in the cylinder and which carries resilient gripper fingers and an annular cutting edge. The gripper fingers extend axially and terminate in radially extending ends that grip the braid. When the gripper fingers move axially, they are cammed shut by contact with two pins secured to the housing. Further movement of the gripper fingers causes the braid to bulge, and the axially moving cutter cuts the braid at the bulge. The device has an ejecter pin for ejecting the severed piece of braid, which ejecter pin is actuated by a separate cylinder positioned inside the main cylinder.

In the Hayden et al. portable wire stripper, gripping jaws and separate cutters are moved laterally into contact with the wire. The jaws and the cutters are cam operated by relative movement between stationary pins and longitudinally tapered slots. After the insulation is cut, longitudinal movement of the gripping jaws pulls the wire away from the cutters to strip the severed insulation. The stripper is powered by a single-acting, spring return air cylinder. On the return stroke of the cylinder, air is discharged through a three-way valve and directed to the region of the cutting heads to blow the severed insulation clear of the device.

The Gudmestad patent discloses electrical apparatus for unwinding, cutting, and stripping wire. The apparatus includes gripping jaws for moving the severed wire laterally to a stripping work station. These gripping jaws are pivotably mounted and interconnected by gears so that they will open and close simultaneously. At the stripping station, there are a pair of gripping jaws, one of which is stationary and one of which pivots, and a pair of blades mounted on slides. The pivotable gripper jaw is cam operated, and the blades are connected by toggle levers and cam operated.

The above patents and the prior art that is discussed and/or cited therein should be studied for the purpose of putting the present invention into proper perspective relative to the prior art.

DISCLOSURE OF THE INVENTION

A subject of the invention is, for use with wire of the type having an inner core and an outer covering, a wire stripper for removing an end portion of the covering from the core. According to an aspect of the invention, the stripper comprises blade means, gripping means, and actuating means. The blade means is for cutting substantially through the covering in a substantially radial direction. The blade means is positioned and dimensioned to provide clearance between itself and the core to avoid contact with the core. The gripping means is positioned axially outwardly of the blade means and grips wire that is to be stripped. The gripping means includes an axially slidable gripper housing, gripper jaw means, and first and second biasing means. The housing has an axial passageway extending therethrough for receiving the wire. The housing also has portions defining a chamber which surrounds the passageway and has generally axially extending sidewall means that tapers toward the blade means. The jaw means is dimensioned to be slidably and closely received to the chamber defined by the housing. The jaw means includes a plurality of gripper jaws, each of which has a tapered outer surface that slidingly engages the sidewall means of the chamber and an axially extending inner grip surface for gripping the wire. The first biasing means urges the jaws radially outwardly toward the sidewall means of the chamber. The second biasing means urges the jaws axially inwardly toward the blade means. The actuating means engages the housing and moves it axially outwardly, to tighten the jaws around the wire and pull the wire away from the blade means to in turn strip the end portion of the covering from the core.

In the preferred embodiment of the invention, the blade means comprises a plurality of pivotably mounted blades. These blades have an open position in which a wire may be moved axially inwardly between the blades, and a closed position in which the blades cut substantially through the covering on a wire that has been inserted between the blades. Mounting means pivotably mounts the blades to allow the blades to pivot into their open position when an end of a wire to be stripped is urged axially inwardly against the blades, and to allow the blades to be pulled and pivoted into their closed position by axially outward movement of a wire that has been inserted between them. The combination of the gripping means and actuating means and the preferred embodiment of the blade means has the advantage of allowing the wire stripper to be actuated by a single, relatively simple actuator that moves the housing of the gripper means axially.

The mounting means for pivotably mounting the blades preferably comprises a plurality of pivotable shafts to each of which a different one of the blades is fixed to pivot therewith, and gear means for synchronizing pivotal movement of the shafts to in turn synchronize the pivoting of the blades between their open and closed positions. Also preferably, the stripper further includes resilient means for biasing the blades toward their closed position to press the blades against a wire that has been inserted therebetween to in turn cause axially outward movement of the wire to pull the blades into their closed position. The stripper may also include the preferred feature of centering means for allowing each blade and the shaft to which it is fixed to move radially an amount sufficient to cause the blades to center around eccentric wire. This feature has the advantage of providing automatic compensation for irregularties in the outer circumference of the insulation and for nonalignment of the axis of the wire with the axis of the stripper due to slight curvature of the wire along its axis.

In the preferred embodiment of the gripping means, the gripper jaws project out from the housing and the chamber defined thereby axially inwardly toward the blade means. In addition, the stripper also includes a jaw stop positioned axially between the gripper jaws and the blade means, and the actuating means includes means for moving the housing axially inwardly. After the end portion of the covering has been stripped from the core by axially outward movement of the housing, the housing is moved axially inwardly to move the jaws against the jaw stop and inwardly relative to the chamber to in turn allow the first biasing means to move the jaws radially outwardly to release the wire. This preferred arrangement has the advantages of providing positive opening of the jaws and of being relatively simple in construction, highly reliable, and relatively simple in operation.

A preferred feature of the invention is the inclusion of means for directing air into the vicinity of the blade means to help keep the blade means free of any debris during axial outward or inward movement of the housing and to blow the end portion of the covering out of the stripper after it has been stripped from the core. In the preferred arrangement for directing such air, the actuating means includes a double-acting cylinder and a five-way valve. The valve directs pressurized air to one end of the cylinder to move the housing axially outwardly, directs pressurized air to the other end of the cylinder to move the housing axially inwardly, and directs exhaust to the vicinity of the blade means from the end of the cylinder opposite the end to which pressurized air is being delivered. By this relatively simple arrangement, a single piston and cylinder and a single valve is all that is necessary to move the housing in both axial directions and to provide air to the vicinity of the blade means whenever the housing is moving either axially inwardly or axially outwardly.

Whenever the wire stripper of the invention is provided with means for ejecting the stripped end portion of the covering, whether such ejection means takes the preferred form described above or some other form, it is preferable that the ejected piece of covering be deflected away from the operator of the stripper when it exits the stripper. In the preferred embodiment of the invention, a deflector is provided in combination with an adjustable wire stop. The wire stop limits axially inward movement of a wire that is being inserted into the stripper. The deflector deflects the stripped portion of the covering away from the operator of the stripper when such stripped portion is ejected out of the stripper. The wire stop and the deflector are connected and may be moved together into a desired axial position to adjust the axial position of the wire stop and in turn adjust the axial length of the end portion of the covering that is to be stripped. The stripper has scale means which is clearly visible to the operator of the stripper to enable the operator to accurately position the wire stop by accurately positioning the deflector.

Another preferred feature of the invention is providing the passageway through the housing with a generally frustoconical axially outer portion to facilitate insertion of a wire into the passageway. Preferably, a portion of the passageway that extends axially inwardly from the frustoconical outer portion is dimensioned to closely receive wire to be stripped and has sidewall means made from a self-lubricating plastic. This provides a bearing surface for axial sliding movement of the wire relative to the housing.

In wire strippers constructed according to the invention, the sidewall means of the chamber preferably tapers at an angle of about seven degrees to about eight degrees with respect to the axis of the gripping means along which the actuating means moves the housing. This orientation of the chamber sidewall means with respect to the longitudinal axis of the gripping means helps to insure the smooth and accurate functioning of the wire stripper. The applicants have conducted experiments in which the orientation was changed from the preferred orientation, and the results of the experiments indicated that an orientation of about seven degrees to about eight degrees is optimal.

The actuating means of the wire stripper of the invention may take a variety of forms. In the preferred embodiment, the actuating means includes two axially extending, radially spaced actuator arms, each of which has an axially outer end portion terminating in a radial lip. The gripper housing includes a main body portion, two opposite side portions, and means for securing the side portions to the body portion. An axial recess terminating in a radial slot is defined between each side portion and the body portion. The end portion and lip of each arm are received into the corresponding recess and slot and held therein by the securing of the body portion and the side portions together. The end portions, lips, recesses, and slots are dimensioned to allow sufficient play between the arms and the housing to prevent binding of the actuating means. This preferred arrangement provides a strong and durable connection between the actuating means and the gripper housing that does not require more than a minimum amount of space. Therefore, the connection helps to keep the overall size of the stripper to a minimum to thereby maximize the portability and easy usability of the stripper.

Another subject of the invention is apparatus for gripping wire and the like. Such apparatus may be used in a wire stripper or in other types of devices in which there is a need to grip wire or similar material. According to an aspect of the invention, the apparatus comprises an axially slidable gripping housing, gripper jaw means, first and second biasing means, and actuating means. The housing has portions defining a chamber which has generally axially extending sidewall means that tapers in a first axial direction. The gripper jaw means is dimensioned to be slidably and closely received into the chamber defined by the housing. Such jaw means includes a plurality of gripper jaws, each of which has a tapered outer surface that slidingly engages the sidewall means of the chamber and an axially extending inner grip surface for gripping the wire. The first biasing means urges the jaws radially outwardly toward the sidewall means of the chamber. The second biasing means urges the jaws in said first axial direction. The actuating means engages the housing and moves it in a second axial direction opposite to said first axial direction, to tighten the jaws around the wire. This combination of elements has the advantages of providing a precise and powerful grip on the wire or other material and of being very durable. The durability is in part due to the relatively large tapered sliding surfaces that are highly resistant to wear, and to the absence of components like pins which are relatively vulnerable to breakage.

Still another subject of the invention is apparatus for radially engaging wire and the like. According to an aspect of the invention, such apparatus comprises an axially slidable jaw housing, jaw means, first and second biasing means, and actuating means. The housing has portions defining a chamber which has generally axially extending sidewall means that tapers in a first axial direction. The jaw means is dimensioned to be slidably and closely received into the chamber defined by the housing. The jaw means includes a plurality of jaws, each of which has a tapered outer surface that slidingly engages the sidewall means of the chamber and an inner surface for engaging the wire. The first biasing means urges the jaws radially outwardly toward the sidewall means of the chamber, and the second biasing means urges the jaws in said first axial direction. The actuating means engages the housing and moves it in a second axial direction opposite to the first axial direction, to close the jaws around the wire. The inner surfaces of the jaws may take a variety of forms. For example, they may be axially elongated and provide a positive gripping action on the wire, or they may be of relatively small extent to engage and act on the wire in some other way, such as punching or cutting the wire or a portion thereof.

The wire stripper of the invention solves the problems discussed above in connection with currently available strippers and manual stripping of wire. The wire stripper of the invention may easily be made portable for use in a variety of environments, including production shops, aircraft fields, and areas inside aircraft. The stripper is also capable of handling a wire variety of wire sizes, including large sizes. The combination of portability and the ability to handle large wire eliminates the need for any manual stripping of wire. This in turn avoids the hazards to workers associated with manual stripping. The stripper of the invention strips wire quickly and accurately and avoids any nicking or scarring of the wire being stripped. The stripper is versatile and easy to operate and provides reliable and consistent stripping of various types of wire.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 1 is a side elevational view of the preferred embodiment of the stripper of the invention.

FIG. 2 is a plan view of the top or bottom of the stripper shown in FIG. 1, depending on how the stripper is held.

FIG. 3 is a side elevational view of the stripper shown in FIGS. 1 and 2, with foreground portions and portions of the actuating means cut away and with parts shown in section.

FIG. 4 is a sectional view of the stripper shown in FIGS. 1-3, with parts shown in elevation and portions of the actuating means cut away and with a wire shown being inserted into the stripper and opening the blades.

FIG. 5 is like FIG. 4 except that it shows the stripper after the wire has been inserted and the actuating means has started to move the housing of the gripping means axially outwardly.

FIG. 6 is like FIG. 5 except that it shows the housing moved outwardly a distance sufficient to close the gripping jaws and pull the wire to close the blades.

FIG. 7 is like FIG. 6 except that it shows the housing near the end of its axially outward movement.

FIG. 8 is like FIG. 7 except that it is taken along a line perpendicular to the section line of FIGS. 3-7 and it shows the stripper after the housing has moved all the way axially outwardly and is beginning to move axially inwardly.

FIG. 9 is like FIGS. 3-7 except that it shows the housing near the end of its axially inward movement.

FIG. 10 is a sectional view taken along the line 10—10 in FIG. 1.

FIG. 11 is a sectional view taken along the line 11—11 in FIG. 2.

FIG. 12 is a sectional view taken along the line 12—12 in FIG. 3.

FIG. 13 is a sectional view taken along the line 13—13 in FIG. 3.

FIG. 14 is a sectional view taken along the line 14—14 in FIG. 3.

FIG. 15 is an exploded pictorial view of the preferred embodiment of the gripping means, actuating arms, and blade opening finger.

FIG. 16 is an exploded pictorial view of the preferred embodiment of the blade means and the mounting means therefor.

FIG. 17 is an exploded pictorial view of the preferred embodiment of the actuating means minus the trigger.

BEST MODE FOR CARRYING OUT THE INVENTION

Figure 18:
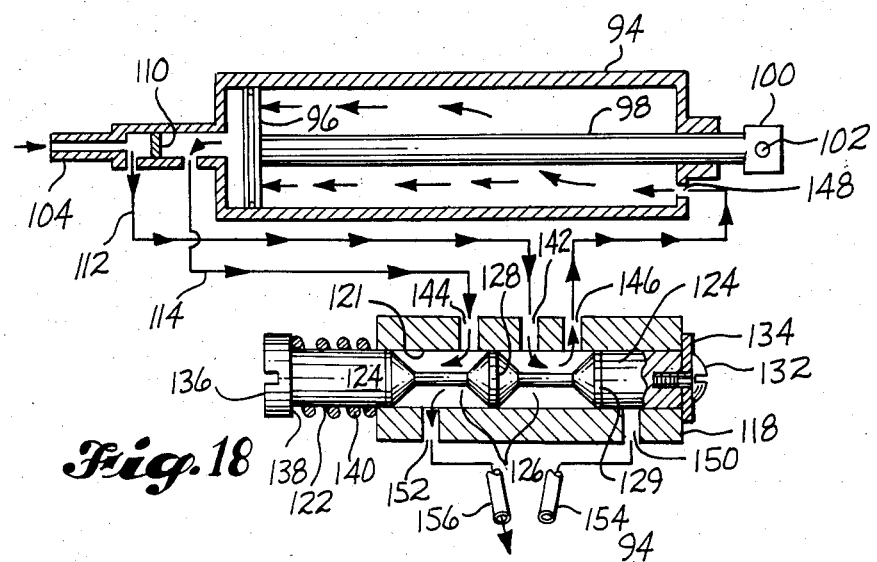
FIG. 18 is a schematic view of the actuator and the valve shown in FIG. 17, with the valve stem in position to move the housing axially inwardly and the piston almost fully retracted.

The drawings show apparatus that is constructed according to the invention and that also constitutes the best mode of the invention currently known to the applicant. In the drawings, the various elements of the apparatus of the invention are shown in a preferred arrangement in a wire stripper 2. It is anticipated that the primary application of the apparatus of the invention will be in wire strippers having arrangements of the type shown in the drawings. However, it is of course to be understood that the apparatus of the invention may also be used to advantage in wire strippers having arrangements other than the arrangement shown in the drawings, and that portions of the apparatus of the invention, particularly the gripping or engaging means, may be used to advantage in various devices other than wire strippers.

The wire stripper 2 shown in the drawings includes a cylindrical casing 3 which houses blade means 4 and gripping means 48. A wire 200 to be stripped is inserted into the open end (the left end as shown in FIGS. 1-9) of the casing 3 and is moved axially inwardly through the gripping means 48 and the blade means 4 until it abuts against a radially extending wire stop 164. The wire 200 includes a conducting core 204 and an outer covering 202 of insulation. The wire stripper 2 strips an end portion 206 of the insulation 202 off of the core 204. The length of the end portion 206 that is stripped is determined by the axial position of the adjustable stop 164.

The blade means 4 cuts through the insulation 202 in a substantially radial direction to nearly sever the end portion 206 of the insulation 202. The blade means 4 does not cut all the way through the insulation 202, but rather leaves a thin web of insulation between itself and the core 204. This thin web is a result of the positioning and dimensioning of the blade means 4 to provide clearance 14 between itself and the core 204 in order to avoid contact with the core 204 and thereby prevent the blades 6,8 from nicking or otherwise damaging the core 204. The clearance 14 is kept to a minimum to minimize the thickness of the web of insulation so that the web may easily be broken simply by pulling or pushing the end portion 206 off of the core 204. In the preferred embodiment, the gripping means 48 grips the wire 200 to pull the wire 200 axially outwardly (to the left in FIGS. 1-9) to close the pivotable blade means 4 and strip the end portion 206 of the insulation 202 off the core 204.

Referring to FIG. 16, the blade means 4 of the preferred embodiment includes a pair of blades 6,8, each of which has a curved cutting edge 10. When the blades 6,8 pivot into their closed cutting position, the portion of blade 6 that carries the cutting edge 10 fits into the portion of blade 8 that carries the cutting edge 10 to bring the two cutting edges 10 together to form a circular cutting edge to cut all the way around the insulation 202 of the wire 200. In their closed position, the blades 6,8 cooperate to form a circular recess 12 on the axially inner side of the blades 6,8 adjacent to the end portion 206 to be stripped.

The blades 6,8 are pivotably mounted on the casing 3 by means of two shafts 16 positioned in diametrically opposite portions of the casing 3. The ends of the shafts 16 are received into and pivot within bearing blocks 24, which are secured to the casing 3 by means of screws 26. Between the ends of the shafts 16 that are received into the bearing blocks 24 is an enlarged diameter portion that forms two radial shoulders 30. In the assembled wire stripper 2, these shoulders 30 are closely adjacent to the corresponding bearing blocks 24. Preferably, a small amount of clearance is provided between each shoulder 30 and the corresponding bearing blocks 24 to allow the shaft 16 and the blade 6,8 attached thereto to move radially a small amount along the axis of the shaft 16. The amount of clearance provided and, therefore, the amount of movement allowed depends on the type of wire to be stripped. The movement automatically compensates for irregularities in the outer circumference of the insulation of the wire or for nonalignment of the axis of the wire with the axis of the stripper 2 due to slight curvature of the wire along its axis. The clearance 14 between the blades 6,8 and the core of the wire must of course be adjusted to accommodate the radial movement of the blades to insure that the core of an eccentric wire is not damaged.

The enlarged diameter center portion of each shaft 16 is provided with a recess 18 for receiving the corresponding blade 6,8. The blade 6,8 is fixed to the shaft 16 by means of a bolt 20 that extends through a washer 22, a hole in the blade 6,8, and a corresponding hole in the enlarged diameter portion of the shaft 16.

In the preferred embodiment, gears 34 are provided for synchronizing pivotal movement of the shafts 16 to in turn synchronize the pivoting of the blades 6,8 between their open position shown in FIG. 5 and their closed position shown in FIG. 6. A resilient spring 42 biases the gears 34 toward the position that corresponds to the closed position of the blades 6,8 to bias the blades 6,8 toward such closed position. This biasing presses the blades 6,8 against a wire 200 that has been inserted between the blades 6,8 so that axially outward movement of the wire 200 will pull the blades 6,8 into their closed position. See FIG. 5. The spring 42 may take various forms. In the embodiment shown in the drawings, the spring is a coil spring 42 which is attached to each of the gears 34 by means of a screw 44 and washer 46.

Referring to FIGS. 11 and 16, each of the two gears 34 is attached to the corresponding shaft 16 by means of a screw 38 that extends through a washer 40 and the gear 34 and into a threaded axial hole in the end of the shaft 16. The reduced diameter end of the shaft into which the screw 38 is threadedly received extends radially outwardly through the bearing blocks 24, a washer 28, and the casing 3 to the gear 34. The gear 34 is prevented from pivoting relative to the shaft 16 to which it is attached by a key 36 that is received into aligned keyways 32,33 in the shaft 16 and gear 34, respectively. Preferably, a gear guard 47 is provided to protect the gears 34 from damage and to prevent an operator's fingers from being pinched by the gears 34.

Referring to FIG. 3, the gripping means 48 is positioned axially outwardly of the blade means 4. The parts of the gripping means 48 are best seen in FIGS. 4-9 and 15. The gripping means 48 includes a housing 50,52,56 and a pair of jaws 66. The housing 50,52,56 has a main body portion 50 and two opposite side portions 52 that are secured to body portion 50 by screws 54. A block 56 forms the axially outer end of the housing 50,52,56 and is secured to the main housing body 50 by screws 57. This block 56 is preferably made from hard self-lubricating nylon or a similar material. A funnel-shaped passageway 60,61 extends through the block 56 and has a generally frustoconical axially outer portion 61 that facilitates insertion of a wire 200 into the passageway 60,61, and a cylindrical portion 60 that extends axially inwardly from the outer portion 61 and is dimensioned to closely receive a wire 200. See FIG. 10. The sidewalls of the passageway portion 60 provide a bearing surface for axial sliding movement of the wire 200 relative to the housing 50,52,56. The passageway 60,61 in the block 56 is aligned with an axial passageway 58 in the main housing portion 50 to form an axial passageway 58,60,61 through the housing 50,52,56. Housing parts 50,52 define a chamber 62 which surrounds the passageway 58. Opposite sidewalls of the chamber 62 are formed by inner sidewalls 64 of housing body 50 which extend in a generally axial direction and taper toward the blade means 4. Preferably, they taper from about 7° to about 8° relative to the longitudinal axis of the stripper 2.

The two jaws 66 are dimensioned to be slidably and closely received into the chamber 62. Each jaw 66 has a tapered outer surface 68 that slidingly engages the tapered sidewalls 64 of the chamber 62. Each jaw 66 also has an axially extending inner grip surface 70 for gripping a wire 200. When the jaws 66 are fully closed, the inner grip surfaces define an oval, rather than round, space. This shape allows the jaws 66 to automatically adjust to variations in wire diameter. The grip surfaces 70 are preferably provided with threads, as shown in the drawings, or some other surface variations to provide a better grip on the wire 200.

The jaws 66 project out of and slide in the chamber 62 but are held in the chamber 62 in the assembled gripping means 48 because of the tapering of surfaces 64,68. Each jaw 66 has a recess 72 formed on its axially outer end. The recesses 72 cooperate to form a substantially cylindrical opening for receiving an axial spring 74. The spring 74 biases the jaws 66 axially inwardly toward the blade means 4. Each jaw 66 is also provided with two radial holes 76 which receive radial springs 78. The springs 78 bias the jaws 66 radially outwardly toward the tapered sidewalls of the chamber 62. The biasing of the jaws 66 toward the sidewalls 64 tends to counteract the biasing action of the axial spring 74 toward the blade means 4.

The wire stripper 2 is provided with actuating means for engaging the housing 50,52,56 and moving it axially outwardly (to the left as shown in FIGS. 1-9) to tighten the jaws 66 around a wire 200 that has been inserted between the jaws 66 and the blades 6,8 to pull the wire 200 away from the blade means 4 and in turn strip the end portion 206 of the insulation 202 from the core 204. In the preferred embodiment shown in the drawings, the actuating means includes two actuator arms 80 that are secured to the inner axial end 50,52 of the housing and extend axially inwardly therefrom. The arms 80 are spaced apart radially to prevent them from interfering with the functioning of the blade means 4 and other portions of the stripper 2. The axially inner end of each arm 80 is provided with a hole 86 for receiving a fastener 103 to attach the arm 80 to the enlarged end 100 of a piston rod 98 having a corresponding hole 102. See FIG. 12. Preferably, the piston rod 98 is part of a piston/cylinder arrangement which provides positive actuation in both axial directions.

Referring to FIG. 15, in the preferred embodiment, the axially outer end 91 of each arm 80 is wider than the rest of the arm 80 and terminates in a radial lip 92. The end 91 is received into a recess 51 in the corresponding housing side portion 52, and the lip 92 extends into a slot 53 formed at the inner end of the recess 51. End 91 and lip 92 are retained in recess 51 and slot 53 by the securing of housing portions 51,52 together. See FIG. 8. Recess 51 and slot 53 are slightly larger than end 91 and tip 92 to allow end 91 and lip 92 to move within recess 51 and slot 53 an amount sufficient to prevent binding of the actuating means. The preferred embodiment of the connection between the actuating arms 80 and the gripper housing 50,52,56 has the advantage of providing a strong and durable connection that occupies only a minimum amount of space. In addition, the connection may be provided with sufficient play to prevent binding, as discussed above, simply by proper dimensioning of its components.

Referring to FIGS. 5 and 6, when the housing 50,52,56 is moved axially outwardly, the jaws 66 at first do not move with the housing 50,52,56 but rather are tightened around a wire 200 that has been inserted therebetween. Once the jaws 66 are fully tightened, the jaws 66 move axially outwardly with the housing 50,52,56 to pull the wire 200 axially outwardly. The axially outward movement of the wire 200 pulls the blades 6,8 into their closed position, as shown in FIG. 6, to cut the insulation 202. Further axially outward movement of the wire 200 then causes the end portion 206 of the insulation 202 to be stripped from the core 204 by the blades 6,8, as shown in FIG. 7.

After the housing 50,52,56 has moved into its extreme axially outward position shown in FIG. 8, the actuating means is operated to move the housing 50,52,56 axially inwardly. As the actuator arms 80 begin to move axially inwardly, a finger 82 attached to one of the arms 80 by means of rivets 84, engages the blades 6,8, as shown in FIG. 8, to momentarily open the blades 6,8 and release the stripped end portion 206 of insulation from the counterbore or recess 12 formed by the blades 6,8. The jaws 66 move axially inwardly with the housing 50,52,56 until they are brought into contact with a jaw stop 88, as shown in Fig. 9. FIG. 13 shows the radial stop surface of jaw stop 88. Once the jaws 66 have hit jaw stop 88, further axially inward movement of the housing 50,52,65 causes the jaws 66 to be pushed inwardly relative to the chamber 62. As the jaws 66 move further into the chamber 62, the radial springs 78 move the jaws apart and radially outwardly against the sidewalls 64 of the chamber 62 to release the wire 200. This permits the wire 200 to be easily pulled out of the stripper 2. The core 204 of the wire 200 freely moves between the blades 6,8, as shown in FIG. 9, because of the clearance 14 provided between the blades 6,8 and the core 204. The blades 6,8 are prevented from pivoting beyond their closed position shown in FIGS. 6 and 7 by a blade stop 90 formed by an axial extension of the jaw stop 88.

The preferred embodiment of the actuating means is best shown in FIGS. 17-20. It includes a double-acting cylinder 94, a piston 96 which reciprocates in the cylinder 94, and a five-way valve 118,122. The valve 118,122 directs pressurized air to one end of the cylinder 94 and one side of the piston 96 to move the gripper housing 50,52,56 axially outwardly and directs pressurized air to the other end of the cylinder 94 and the other side of the piston 96 to move the housing 50,52,56 axially inwardly. The valve 118,122 also directs exhaust from the end of the cylinder to which pressurized air is not being delivered to the vicinity of the blade means 4 to help keep the blade means 4 free of any debris and to blow the stripped end portion 206 of insulation out of the stripper 2 through an opening 171 in the casing 3. The ejection of end portion 206 occurs during the return, axially inward, stroke of the piston 96 and piston rod 98, as shown in FIG. 9.

A fitting 104 is provided on the end of the cylinder 94 opposite the piston rod 98. The outer end of the fitting 104 has means 106 for coupling the fitting 104 to an air hose that is connected to a source of pressurized air (not shown). The other end 108 of the fitting 104 is threadedly attached to the outer radial end of the cylinder 94. The fitting 104 has an axial passageway therethrough which is blocked by a plug 110. Two tubes 112,114 communicate with the axial passageway through fitting 104 and extend from fitting 104 to the valve 118,122, which is mounted on the opposite end of the cylinder 94. Tube 112 communicates with the passageway on the far side of plug 110 to directly communicate the source of pressurized air with the valve 118,122. Tube 114 communicates with the passageway on the other side of plug 10 to provide communication between the far side of piston 96 and the valve 118,122.

The valve 118,122 includes a valve block 118 and a valve stem 122. The block 118 has a mounting flange 119 by means of which it is attached to the end of the cylinder through which the piston rod 98 projects. The ends of tubes 112, 114 that communicate with valve 118,122 are secured, such as by welding, to a mounting plate 116 which is in turn attached to valve block 118 by screws 120.

Valve block 118 has a cylindrical bore 121 extending therethrough perpendicular to the axis of the cylinder 94 and the stripper 2. Valve block 118 has five ports 142,144,146,150,152 that communicate with the bore 121 and open onto side surfaces of the block 118. Two of these ports 142,144 open onto the upper side surface of the block 118 (as shown in FIG. 17) and are positioned to communicate with tubes 112,114 respectively. Port 146 opens onto the back surface of the block 118 and is aligned with a hole 148 in the adjacent end of the cylinder 94 to communicate the bore 121 with the near side of the piston 96. Ports 150,152 open onto the front face of the valve block 118 and communicate with exhaust tubes 154,156 respectively. Tubes 154,156 are mounted onto valve block 118 by means of a mounting plate 158 which is secured to block 118 by screws 160. Tubes 154,156 extend from plate 158 to the vicinity of the blade means 4. The ends of tubes 154,156 near the blade means 4 are curved to direct exhaust from the cylinder 94 as described above.

Valve stem 122 is received into bore 121 and includes an elongated land 124 on each of its ends, a galley 126 adjacent to each land 124, and a central relatively narrow land 128 separating the two galleys 126. Preferably, an O-ring 129 is provided on each of the lands 124,128. One of the radial end surfaces of the stem 122 is provided with an axial hole 130 for receiving a screw 132. The screw 132 and a washer 134 abut the radial end surface of the valve block 118 to limit movement of the stem 122 relative to the block 118. The other end of the valve stem 122 is provided with a head 136 that forms a radial shoulder 138 adjacent to land 124. A coil spring 140 is received around the outer portion of land 124 and is compressed between shoulder 138 and the facing radial end surface of valve block 118. Head 136 and washer 134 cooperate to prevent stem 122 from moving out of bore 121, and spring 140 biases stem 122 into a position in which washer 134 abuts block 118. A trigger 162 is mounted on casing 3 and engages the head 136 of valve stem 122 to facilitate movement of valve stem 122 against the force of spring 140. The trigger 162 is pressed to move valve stem 122 into the position shown in FIG. 19 and is released to allow spring 140 to move stem 122 into the position shown in FIG. 18.

Figure 19:
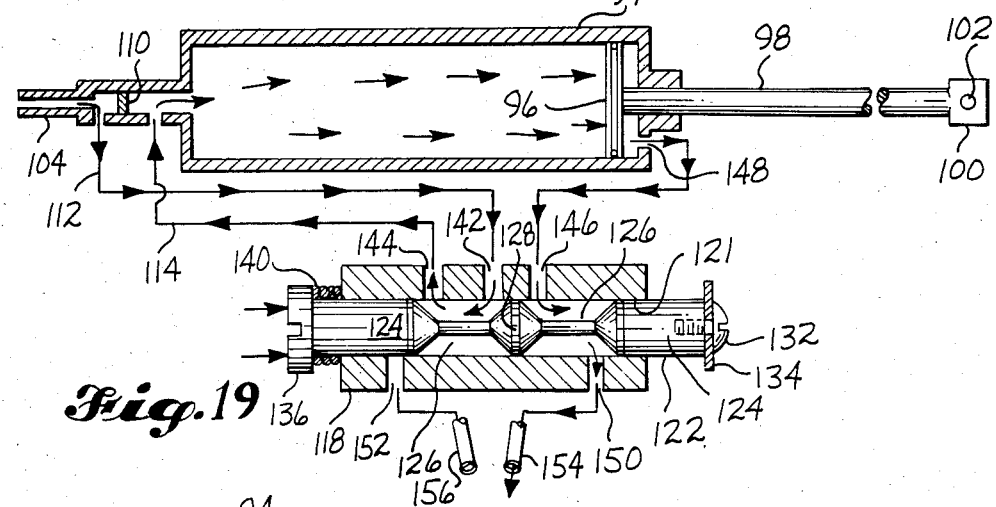
FIG. 19 is like FIG. 18 except that it shows the valve stem in position to move the housing axially outwardly.
Figure 20:
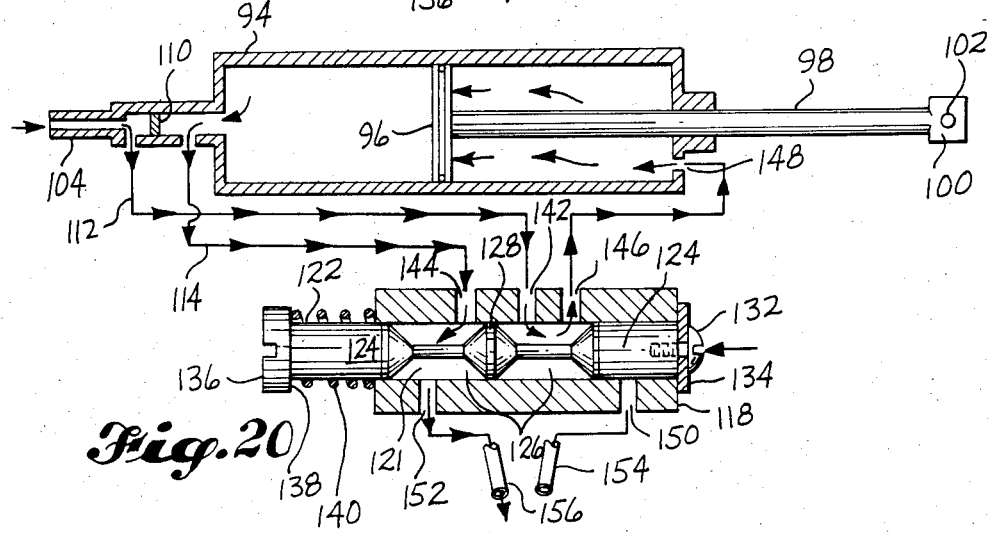
FIG. 20 is like FIG. 18 except that it shows the piston in an intermediate position.

FIGS. 18-20 show the operation of the cylinder 94 and valve 118,122 in somewhat schematic form. FIGS. 18 and 20 show the valve in position to retract the piston rod 98 and thereby move the gripper housing 50,52,56 axially inwardly. FIG. 18 shows the piston rod 98 almost fully retracted, and FIG. 20 shows the piston rod 98 in an intermediate position. In each of FIGS. 18 and 20, pressurized air enters fitting 104 and moves through tube 112 and port 142 into bore 121 and around galley 126 and then out of valve block 118 through port 146 into the near end of cylinder 94 through opening 148. The air entering cylinder 94 through opening 148 pushes the piston 96 to the left (as shown) to retract piston rod 98. As piston 96 moves to the left, air is exhausted out of the far side of the cylinder 94 through fitting 104 and tube 114 and into valve block 118 through port 144. Air entering through port 144 moves through bore 121 around galley 126 and out through port 152 to be directed by tube 156 to the vicinity of the blade means 4. Land 128 blocks communication between ports 142,146 and ports 144,152. The elongated land 124 opposite head 136 blocks exhaust port 150.

FIG. 19 shows the valve stem 122 in position to move the piston 96 to the right (as shown) to extend the piston rod 98. In FIG. 19, piston rod 98 is shown almost fully extended. The elongated land 124 adjacent head 136 is now blocking exhaust port 152, and land 128 is blocking communication between ports 142,144 and ports 146,150. Pressurized air enters valve block 118 through tube 112 and port 142, moves through bore 121 and around galley 126, and exits valve block 118 through port 144. The pressurized air exiting port 144 moves through tube 114 into fitting 104 and then into the far side of cylinder 94 to act on piston 96 and extend piston rod 98. Exhaust from the near end of cylinder 94 exits cylinder 94 through opening 148 and enters valve block 118 through port 146. The exhaust air moves through bore 121 and around land 126 and exits block 118 through port 150, from which it is directed by tube 154 to the vicinity of the blade means 4.

During the retracting stroke of piston rod 98, the stripped end portion 206 of insulation is blown out of the casing 3 of the stripper 2 through opening 171. In order to prevent the end portion 206 from hitting and/or startling the operator of the stripper 2, a deflector 168,170 is provided for deflecting such end portion 206 away from the operator. The main portion of the deflector 168,170 forms a hood 168 into which the end portion 206 is blown and which deflects the end portion 206. Deflector 168,170 also has a flat portion 170 that extends axially from the closed end of the hood 168. This plate 170 provides means for mounting the deflector 168,170 onto the casing 3.

In the preferred embodiment shown in the drawings, the stripper 2 also includes an L-shaped member 164,166. This member 164,166 has a radial portion 164 that serves as a wire stop, as described above, and an axial portion 166 that extends parallel to the axial portion 170 of the deflector 168,170. Axial portions 166,170 have aligned radial holes extending therethrough for receiving a threaded shaft 176 which secures deflector 168,170 and member 164,166 to each other and to casing 3. An axial slot 172 is provided in casing 3 for receiving shaft 176 and allowing the axial position of members 164,166 and 168,170 to be adjusted. The radially outer end of shaft 166 is secured to a knob 174 for tightening plates 170,166 against casing 3 to secure deflector 168,170 and member 164,166 in a particular axial position relative to casing 3, and for loosening plates 170,166 to allow them to be slid axially relative to casing 3 to adjust their axial position. The adjustment of such axial position is made in order to adjust the position of the wire stop 164 and thereby adjust the length of the end portion 206 of insulation 202 to be stripped from the wire 200. Preferably, scale means is provided in a position clearly visible to the operator of the stripper 2 to enable the operator to accurately position wire stop 164 by accurately positioning the deflector 168,170. As shown in FIG. 1, this scale means may take the form of a prominent scale 178 on an outer surface of deflector 168,170, which scale 178 is adjacent to and may be slid past a reference line 180 on the casing 3.

The operation of the wire stripper 2 is as follows. Wire stop 164 is adjusted, as necessary. Then the fitting 104 on cylinder 94 is connected to a source of pressurized air, and the trigger 162 is left in a released position. This causes pressurized air to retract piston rod 98 or keep it in a retracted position to move or maintain the gripping means 48 in its extreme axially inner position shown in FIG. 4. In this position, jaws 66 are abutting jaw stop 88, are pushed all the way down into chamber 62, and are being urged by radial springs 78 into their most open position. Referring to FIG. 4, a wire 200 is inserted into the stripper, through funnel 61,60 and open jaws 66 and against blades 6,8. The wire 200 is pushed axially inwardly against the blades 6,8. The pivotable mounting of blades 6,8 allows them to pivot into their open position in response to the pushing action of wire 200. FIG. 4 shows wire 200 just beginning to push blades 6,8 into an open position. The wire 200 is pushed all the way into the stripper 2 until it hits wire stop 164.

Once wire 200 has been inserted, the trigger 162 is depressed to cause axially outward movement of gripper housing 50,52,56. The beginning of such movement is shown in FIG. 5. As noted above, first the outward movement of housing 50,52,56 tightens jaws 66 around wire 200, and then further movement of housing 50,52,56 moves jaws 66 and wire 200 along with it. The initial movement of wire 200 closes blades 6,8 to cut the insulation 202 of wire 200, as shown in FIG. 6. Further movement of wire 200 causes end portion 206 of the insulation to be stripped from the wire 200 because the blades 6,8 prevent end portion 206 from moving with the wire 200. FIG. 7 shows the stripper 2 as the housing 50,52,56 continues to move axially outwardly and the end portion 206 has been stripped from wire 200.

Once housing 50,52,56 has reached its extreme axially outer position, shown in FIG. 8, trigger 162 is released to cause the actuating means to retract the piston rod 98 and move the housing 50,52,56 axially inwardly. FIG. 8 shows the stripper 2 just as the housing 50,52,56 is beginning to move axially inwardly. The finger 82 carried by actuator arm 80 is just beginning to open blades 6,8 to release the insulation end portion 206. FIG. 9 shows the stripper near the end of the retraction stroke and illustrates the end portion 206 being blown out through deflector hood 168, wire core 204 freely moving between blades 6,8, and jaws 66 being moved back into chamber 62 by contact with jaw stop 88 to cause jaws 66 to open. Once the retraction stroke is completed, the jaws 66 are fully open and the wire 200 may easily be withdrawn from the stripper 2. The stripper 2 is then ready to strip another piece of wire.

From the above, it should be ovbious that the preferred embodiment of the invention provides a wire stripper 2 that may be quickly and easily operated. By means of a simple trigger, a single valve, and a single cylinder, a wire may be fully stripped, the stripped insulation ejected, and the blade means kept free of debris.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the invention as defined by the following claims.

What is claimed is:

1. For use with wire of the type having an inner core and an outer covering, a wire stripper for removing an end portion of the covering from the core, said stripper comprising:

blade means for cutting substantially through the covering in a substantially radial direction, said blade means being positioned and dimensioned to provide clearance between itself and the core to avoid contact with the core;

gripping means positioned axially outwardly of the blade means for gripping wire to be stripped; said gripping means including an axially slidable gripper housing, gripper jaw means, and first and second biasing means; said housing having an axial passageway extending therethrough for receiving the wire, and portions defining a chamber which surrounds the passageway and has generally axially extending sidewall means that tapers toward the blade means; said jaw means being dimensioned to be slidably and closely received into the chamber defined by the housing; said jaw means including a plurality of gripper jaws, each of which has a tapered outer surface that slidingly engages said sidewall means and an axially extending inner grip surface for gripping the wire; said first biasing means urging the jaws radially outwardly toward said sidewall means; and said second biasing means urging the jaws axially inwardly toward the blade means; and actuating means for engaging the housing and moving it axially outwardly, to tighten the jaws around the wire and pull the wire away from the blade means to in turn strip said end portion of the covering from the core.

2. A wire stripper as recited in claim 1;
in which the blade means comprises a plurality of blades which have an open position in which a wire may be moved axially inwardly between the blades, and a closed position in which the blades cut substantially through the covering on a wire that has been inserted between the blades; and
which further comprises mounting means for pivotably mounting the blades, to allow the blades to pivot into their open position when an end of a wire to be stripped is urged axially inwardly against the blades, and to allow the blades to be pulled and pivoted into their closed position by axially outward movement of a wire that has been inserted between them.

3. A wire stripper as recited in claim 2, in which the mounting means comprises a plurality of pivotable shafts to each of which a different one of the blades is fixed to pivot therewith, and gear means for synchronizing pivotal movement of the shafts to in turn synchronize the pivoting of the blades between their open and closed positions.

4. A wire stripper as recited in claim 2, further comprising resilient means for biasing the blades toward their closed position to press the blades against a wire that has been inserted therebetween to in turn cause axially outward movement of such wire to pull the blades into their closed position.

5. A wire stripper as recited in claim 3, further comprising resilient means for biasing the blades toward their closed position to press the blades against a wire that has been inserted therebetween to in turn cause axially outward movement of such wire to pull the blades into their closed position.

6. A wire stripper as recited in claim 3, further comprising centering means for allowing each blade and the shaft to which it is fixed to move radially an amount sufficient to cause the blades to center around eccentric wire.

7. A wire stripper as recited in claim 5, further comprising centering means for allowing each blade and the shaft to which it is fixed to move radially an amount sufficient to cause the blades to center around eccentric wire.

8. A wire stripper as recited in claim 1, in which the gripper jaw project out from the housing and the chamber defined thereby axially inwardly toward the blade means; which further comprises a jaw stop positioned axially between the gripper jaws and the blade means; and in which the actuating means includes means for moving the housing axially inwardly, after said end portion of the covering has been stripped from the core by axially outward movement of the housing, to move the jaws against the stop and inwardly relative to the chamber to in turn allow the first biasing means to move the jaws radially outwardly to release the wire.

9. A wire stripper as recited in claim 8, in which the actuating means includes a double-acting cylinder; and a five-way valve for directing pressurized air to one end of the cylinder to move the housing axially outwardly, for directing pressurized air to the other end of the cylinder to move the housing axially inwardly, and for directing exhaust to the vicinity of the blade means from said other end of the cylinder when the housing is moving axially outwardly and from said one end of the cylinder when the housing is moving axially inwardly to help keep the blade means free of any debris and to blow said end portion of the covering out of the stripper after it has been stripped from the core.

10. A wire stripper as recited in claim 9, further comprising an adjustable wire stop for limiting axially inward movement of a wire that is being inserted into the stripper, a deflector for deflecting said end portion of the covering away from an operator of the stripper when said end portion is blown out of the stripper, means for connecting the wire stop and the deflector and moving them together into a desired axial position to adjust the axial position of the wire stop and in turn adjust the axial length of said end portion of the covering to be stripped, and scale means clearly visible to an operator of the stripper for enabling the operator to accurately position the wire stop by accurately positioning the deflector.

11. A wire stripper as recited in claim 2, in which the gripper jaws project out from the housing and the chamber defined thereby axially inwardly toward the blade means; which further comprises a jaw stop positioned axially between the gripper jaws and the blade means; and in which the actuating means includes means for moving the housing axially inwardly, after said end portion of the covering has been stripped from the core by axially outward movement of the housing, to move the jaws against the stop and inwardly relative to the chamber to in turn allow the first biasing means to move the jaws radially outwardly to release the wire.

12. A wire stripper as recited in claim 11, in which the actuating means includes a double-acting cylinder; and a five-way valve for directing pressurized air to one end of the cylinder to move the housing axially outwardly, for directing pressurized air to the other end of the cylinder to move the housing axially inwardly, and for directing exhaust to the vicinity of the blade means from said other end of the cylinder when the housing is moving axially outwardly and from said one end of the cylinder when the housing is moving axially inwardly to help keep the blade means free of any debris and to blow said end portion of the covering out of the stripper after it has been stripped from the core.

13. A wire stripper as recited in claim 12, further comprising an adjustable wire stop for limiting axially inward movement of a wire that is being inserted into the stripper, a deflector for deflecting said end portion of the covering away from an operator of the stripper when said end portion is blown out of the stripper, means for connecting the wire stop and the deflector and moving them together into a desired axial position to adjust the axial position of the wire stop and in turn adjust the axial length of said end portion of the covering to be stripped, and scale means clearly visible to an operator of the stripper for enabling the operator to accurately position the wire stop by accurately positioning the deflector.

14. A wire stripper as recited in claim 1, further comprising means for ejecting said end portion of the covering out of the stripper after it has been stripped from the core, an adjustable wire stop for limiting axially inward movement of a wire that is being inserted into the stripper, a deflector for deflecting said end portion of the covering away from an operator of the stripper when said end portion is ejected out of the stripper, means for connecting the wire stop and the deflector and moving them together into a desired axial position to adjust the axial position of the wire stop and in turn adjust the axial length of said end portion of the covering to be stripped, and scale means clearly visible to an operator of the stripper for enabling the operator to accurately position the wire stop by accurately positioning the deflector.

15. A wire stripper as recited in claim 11, further comprising resilient means for biasing the blades toward their closed position to press the blades against a wire that has been inserted therebetween to in turn cause axially outward movement of such wire to pull the blades into their closed position.

16. A wire stripper as recited in claim 11, in which the mounting means comprises a plurality of pivotable shafts to each of which a different one of the blades is fixed to pivot therewith, and gear means for synchronizing pivotal movement of the shafts to in turn synchronize the pivoting of the blades between their open and closed positions.

17. A wire stripper as recited in claim 16, further comprising resilient means for biasing the blades toward their closed position to press the blades against a wire that has been inserted therebetween to in turn cause axially outward movement of such wire to pull the blades into their closed position.

18. A wire stripper as recited in claim 1, in which the passageway through the housing has a generally frustoconical axially outer portion to facilitate insertion of a wire into the passageway.

19. A wire stripper as recited in claim 18, in which a portion of the passageway that extends axially inwardly from the frustoconical outer portion is dimensioned to closely receive wire to be stripped, and has sidewall means made from a self-lubricating plastic to provide a bearing surface for axial sliding movement of the wire relative to the housing.

20. A wire stripper as recited in claim 1, in which the gripping means has a longitudinal axis along which the actuating means moves the housing, and the sidewall means of the chamber tapers at an angle of about 7° to about 8° with respect to such axis.

21. A wire stripper as recited in claim 8, in which the gripping means has a longitudinal axis along which the actuating means moves the housing, and the sidewall means of the chamber tapers at an angle of about 7° to about 8° with respect to such axis.

22. A wire stripper as recited in claim 11, in which the gripping means has a longitudinal axis along which the actuating means moves the housing, and the sidewall means of the chamber tapers at an angle of about 7° to about 8° with respect to such axis.

23. A wire stripper as recited in claim 15, in which the gripping means has a longitudinal axis along which the actuating means moves the housing, and the sidewall means of the chamber tapers at an angle of about 7° to about 8° with respect to such axis.

24. A wire stripper as recited in claim 17, in which the gripping means has a longitudinal axis along which the actuating means moves the housing, and the sidewall means of the chamber tapers at an angle of about 7° to about 8° with respect to such axis.

25. A wire stripper as recited in claim 1, in which the gripper housing includes a main body portion, two opposite side portions, means for securing the side portions to the body portion, and an axial recess terminating in a radial slot defined between each side portion and the body portion; and the actuating means includes two axially extending, radially spaced actuator arms, each of which has an axially outer end portion terminating in a radial lip; said end portion and lip being received into the corresponding recess and slot and held therein by the securing of the body portion and the side portions together; and said end portions, lips, recesses, and slots being dimensioned to allow sufficient play between the arms and the housing to prevent binding of the actuating means.

26. Apparatus for gripping wire comprising:
an axially slidable gripper housing having portions defining a chamber which has generally axially extending sidewall means that tapers in a first axial direction;
gripper jaw means dimensioned to be slidably and closely received into the chamber defined by the housing; said jaw means including a plurality of gripper jaws, each of which has a tapered outer surface that slidingly engages said sidewall means and an axially extending inner grip surface for gripping the wire;
first biasing means for urging the jaws radially outwardly toward said sidewall means;

second biasing means for urging the jaws in said first axial direction; and actuating means for engaging the housing and moving it in a second axial direction opposite to said first axial direction, to tighten the jaws around the wire.

27. Apparatus for gripping wire and the like, comprising:

an axially slidable gripper housing having portions defining a chamber which has generally axially extending sidewall means that tapers in a first axial direction;

gripper jaw means dimensioned to be slidably and closely received into the chamber defined by the housing; said jaw means including a plurality of gripper jaws, each of which has a tapered outer surface that slidingly engages said sidewall means and an axially extending inner grip surface for gripping the wire; and said gripper jaws projecting out from the housing and the chamber defined thereby in said first axial direction;

a jaw stop positioned in said first axial direction relative to the jaws;

first biasing means for urging the jaws radially outwardly toward said sidewall means;

second biasing means for urging the jaws in said first axial direction; and actuating means for engaging the housing and moving it in a second axial direction opposite to said first axial direction, to tighten the jaws around the wire; said actuating means including means for moving the housing in said first axial direction to move the jaws against the stop and inwardly relative to the chamber to in turn allow the first biasing means to move the jaws radially outwardly to release a wire around which the jaws have been tightened.

28. Apparatus for gripping wire and the like, comprising:

an axially slidable gripper housing having portions defining a chamber which has generally axially extending sidewall means that tapers in a first axial direction; said housing having an axial passageway that opens onto a radial end surface of the housing and communicates with the chamber; and said passageway having an outer portion that tapers inwardly from said radial end surface toward the chamber to facilitate insertion of a wire into the passageway, and an inner portion which communicates said outer portion and the chamber and which has sidewall means that is dimensioned to closely receive wire to be gripped and that is made from a self-lubricating plastic to provide a bearing surface for axial sliding movement of the wire relative to the housing;

gripper jaw means dimensioned to be slidably and closely received into the chamber defined by the housing; said jaw means including a plurality of gripper jaws, each of which has a tapered outer surface that slidingly engages said sidewall means and an axially extending inner grip surface for gripping the wire;

first biasing means for urging the jaws radially outwardly toward said sidewall means;

second biasing means for urging the jaws in said first axial direction; and actuating means for engaging the housing and moving it in a second axial direction opposite to said first axial direction, to tighten the jaws around the wire.

29. Apparatus as recited in claim 26, in which the housing has a longitudinal axis, the actuating means moves the housing along such axis, and said sidewall means of the chamber tapers at an angle of about 7° to about 8° with respect to such axis.

30. Apparatus as recited in claim 27, in which the housing has a longitudinal axis, the actuating means moves the housing along such axis, and said sidewall means of the chamber tapers at an angle of about 7° to about 8° with respect to such axis.

31. Apparatus for radially engaging wire, comprising:

an axially slidable jaw housing having portions defining a chamber which has generally axially extending sidewall means that tapers in a first axial direction;

jaw means dimensioned to be slidably and closely received into the chamber defined by the housing; said jaw means including a plurality of jaws, each of which has a tapered outer surface that slidingly engages said sidewall means and an inner surface for engaging the wire;

first biasing means for urging the jaws radially outwardly toward said sidewall means;

second biasing means for urging the jaws in said first axial direction; and actuating means for engaging the housing and moving it in a second axial direction opposite to said first axial direction, to close the jaws around the wire.

* * * * *